US012616102B1

(12) United States Patent
     Li

(10) Patent No.: US 12,616,102 B1
(45) Date of Patent: May 5, 2026

(54) ELECTRIC PRUNING SHEAR

(71) Applicant: Yinchao Li, Jinhua City (CN)

(72) Inventor: Yinchao Li, Jinhua City (CN)

( * ) Notice: Subject to any disclaimer, the term of this patent is extended or adjusted under 35 U.S.C. 154(b) by 0 days.

(21) Appl. No.: 19/397,038

(22) Filed: Nov. 21, 2025

(51) Int. Cl.
     *A01G 3/037* (2006.01)
     *B26B 15/00* (2006.01)

(52) U.S. Cl.
     CPC .............. *A01G 3/037* (2013.01); *B26B 15/00* (2013.01)

(58) Field of Classification Search
     None
     See application file for complete search history.

(56) References Cited

U.S. PATENT DOCUMENTS

2021/0299894 A1* 9/2021 Lu .......................... B26B 13/285
2023/0411586 A1* 12/2023 Shu .......................... B26B 15/00

FOREIGN PATENT DOCUMENTS

| CN | 201563409 U | * | 9/2010 | ............. A01G 3/037 |
| CN | 109392487 A | * | 3/2019 | ............. A01G 3/021 |
| CN | 214628309 U | * | 11/2021 | |
| CN | 115383798 A | * | 11/2022 | ............. A01G 3/037 |
| GB | 2493071 A | * | 1/2013 | ............. B26B 15/00 |
| IT | 20090058 A1 | * | 11/2010 | |
| WO | WO-2023139500 A1 | * | 7/2023 | ............... F16H 1/12 |

OTHER PUBLICATIONS

English translation of CN-214628309-U, dated Nov. 9, 2021.*
English translation of CN-115383798-A, dated Nov. 25, 2022.*
English translation of WO-2023139500-A1, dated Jul. 27, 2023.*
English translation of CN-109392487-A, dated Mar. 1, 2019.*
English translation of PL20090058-A1, dated Nov. 16, 2010.*
English translation of CN-201563409-U, dated Sep. 1, 2010.*

* cited by examiner

*Primary Examiner* — Hwei-Siu C Payer

(57) ABSTRACT

The present invention discloses an electric pruning shear comprising a housing, a drive assembly mounted inside the housing, a support frame, a shearing assembly mounted on the support frame, and a control mechanism installed within the housing. The support frame is mounted at the upper end of the drive assembly, and the control mechanism is electrically connected to the drive assembly to control its activation and deactivation.

5 Claims, 9 Drawing Sheets

ELECTRIC PRUNING SHEAR

FIELD OF THE APPLICATION

The present invention relates to the technical field of electric pruning shears, specifically to an electric pruning shear.

BACKGROUND

As an efficient and labor-saving gardening tool, electric pruning shears are widely used in operations such as fruit tree pruning and hedge shaping. They are typically driven by an electric motor that activates a transmission mechanism, which in turn causes the moving blade to perform a reciprocating oscillation relative to the fixed blade, thereby achieving the cutting action. During operation, frequent friction occurs between moving components such as the blades, oscillating teeth, and the spindle. Prolonged use can easily lead to wear, affecting cutting efficiency and the tool's service life. Therefore, regular lubrication maintenance for these moving parts is essential.

Existing electric pruning shears generally lack a built-in, convenient lubrication system. Operators often need to manually prepare lubricating oil or grease and apply it periodically after disassembling part of the housing or components. This method presents several inconveniences: First, operators need to carry lubricants separately, which is particularly inconvenient during outdoor work. Second, manual application makes it difficult to control the amount of lubricant precisely, often resulting in either excessive oil that contaminates the work area or insufficient oil that compromises lubrication effectiveness. Furthermore, the disassembly process is relatively cumbersome, not only increasing maintenance time but also potentially adversely affecting the tool's connection structure and sealing performance due to frequent assembly and disassembly. Additionally, since real-time lubrication during tool operation is not possible, moving parts may operate in a state of dry friction during the middle or later stages of a prolonged task due to depleted or lost grease, accelerating wear.

Therefore, to address the aforementioned technical issues, an electric pruning shear is designed.

SUMMARY

The technical problem to be solved by the present invention is to overcome the above-mentioned technical deficiencies and provide an electric pruning shear.

To solve the above technical problem, the technical solution provided by the present invention is an electric pruning shear, comprising: a housing; a drive assembly mounted inside the housing; a support frame; a shearing assembly mounted on the support frame; and a control mechanism installed inside the housing. The support frame is mounted at an upper end of the drive assembly. The control mechanism is electrically connected to the drive assembly and is configured to control activation and deactivation of the drive assembly.

The shearing assembly comprises a fixed blade, a moving blade, an oscillating tooth, and a spindle. One side of the support frame is provided with a fixed blade mounting slot. An upper end of the support frame is provided with a shaft hole penetrating through the support frame and the blade mounting slot. The spindle is disposed in the shaft hole. The fixed blade, a lower portion of the moving blade, and a middle-upper portion of the oscillating tooth are each provided with a spindle hole. The spindle hole of the fixed blade is sleeved on the spindle, and the lower portion of the fixed blade is mounted in the fixed blade mounting slot. The fixed blade mounting slot limits the fixed blade, thereby fixing the fixed blade and preventing it from rotating. The moving blade is disposed outside the fixed blade and is rotatably connected to the spindle via its spindle hole. The oscillating tooth is disposed outside the moving blade and is rotatably connected to the spindle via its spindle hole. An upper end of the oscillating tooth and a middle-lower portion of the moving blade are each provided with a connection hole. A connection shaft is rotatably disposed within the connection holes, connecting the oscillating tooth and the moving blade to achieve linkage between the oscillating tooth and the moving blade. A lower end of the oscillating tooth meshes with the drive assembly. The drive assembly drives the oscillating tooth to oscillate, thereby driving the moving blade to oscillate about the spindle to achieve opening and closing of the pruning shear. A lock nut is provided on the spindle outside the oscillating tooth. Another end of the spindle is provided with an oil inlet hole. The spindle is provided with an oil outlet hole communicating with the oil inlet hole.

The electric pruning shear further comprises an oil reservoir installed inside the housing. A lower end of the oil reservoir is provided with an oil tube communicating with an interior of the oil reservoir. Another end of the oil tube communicates with the oil inlet hole. An upper end of the oil reservoir is provided with a plunger button.

As an improvement, the control mechanism comprises a control board, a Hall effect board, and a trigger switch. The control board is disposed at the bottom inside the housing. The support frame is provided with the Hall effect board below the moving blade. The Hall effect board is electrically connected to the control board. One side of the support frame inside the housing is rotatably provided with the trigger switch that cooperates with the Hall effect board.

As an improvement, the drive assembly comprises a motor and a gearbox connected to the motor. A lower end of the support frame is mounted on an upper end of the gearbox, and an output shaft of the gearbox extends into the support frame. One side of the support frame is provided with a drive gear driven by the output shaft of the gearbox. The oscillating tooth meshes with the drive gear. The motor is electrically connected to the control board.

As an improvement, the spindle holes of the moving blade and the oscillating tooth are each provided with a bearing. The moving blade and the oscillating tooth are each rotatably connected to the spindle via the bearing.

As an improvement, one end of the spindle provided with the oil inlet hole is provided with a locking gear via a key. The locking gear is sleeved with a locking element. The locking gear meshes with an inner wall of the locking element. A bottom of the locking element is provided with a locking slot.

The support frame is provided with a locking screw hole below the shaft hole. The locking element is connected by a bolt to the locking screw hole, and is used to fix the locking element, thereby locking the spindle and the locking gear.

One side of the housing adjacent to the locking gear is provided with a slot for accommodating the locking element. The slot is snap-fitted with a protective cover.

The present invention offers the following advantages compared to prior art:

1. Internal Oil Storage: A dedicated lubricant container, the oil reservoir, is installed inside the pruning shear, capable of storing a certain amount of lubricating oil. This eliminates the need for the operator to carry an external lubricant container, making it more convenient to use.

2. Automatic Lubrication Function: The lower end of the oil reservoir is provided with an oil tube communicating with its interior. The other end of the oil tube communicates with the oil inlet hole, and the upper end of the oil reservoir is provided with a plunger button. This allows lubricant to be delivered to the oil inlet hole by pressing the plunger button, enabling automatic delivery of lubricant to components requiring lubrication (such as the blades and transmission shaft) during the operation of the pruning shear, achieving real-time lubrication and reducing component wear.

3. Efficient Cutting Function: The use of a high-performance electric drive system and sharp cutting blades enables fast and accurate cutting of various branches, meeting the needs of different garden trimming scenarios.

BRIEF DESCRIPTION OF THE DRAWINGS

As shown in FIGS. 1-9:

1. Housing, 2. Support Frame, 3. Fixed Blade, 4. Moving Blade, 5. Oscillating Teeth, 6. Spindle, 7. Fixed Blade Mounting Slot, 8. Spindle Hole, 9. Connection Hole, 10. Connection Shaft, 11. Lock Nut, 12. Oil Inlet, 13. Oil Reservoir, 14. Oil Tube, 15. Plunger Button, 16. Control Board, 17. Hall Effect Board, 18. Trigger Switch, 19. Motor, 20. Gearbox, 21. Drive Gear, 22. Oil Outlet, 23. Locking Gear, 24. Locking Element, 25. Locking Slot, 26. Locking Screw Hole, 27. Slot Opening, 28. Protective Cover, 29. Shaft Hole.

While the technology is susceptible to various modifications and alternative forms, specifics thereof have been shown by way of example and drawings, and will be described in detail. It should be understood, however, that the application is not limited to the particular embodiments described. On the contrary, the application is to cover modifications, equivalents, and alternatives falling within the spirit and scope of the technology.

DETAILED DESCRIPTION OF EMBODIMENTS

The embodiments of the present technology described herein are not intended to be exhaustive or to limit the technology to the precise forms disclosed in the following detailed description. Rather, the embodiments are chosen and described so that others skilled in the art can appreciate and understand the principles and practices of the present technology.

All publications and patents mentioned herein are hereby incorporated by reference. The publications and patents disclosed herein are provided solely for their disclosure. Nothing herein is to be construed as an admission that the inventors are not entitled to antedate any publication and/or patent, including any publication and/or patent cited herein.

The following provides a further detailed description of an electric pruning shear according to the present invention with reference to the accompanying drawings.

Figure 1:
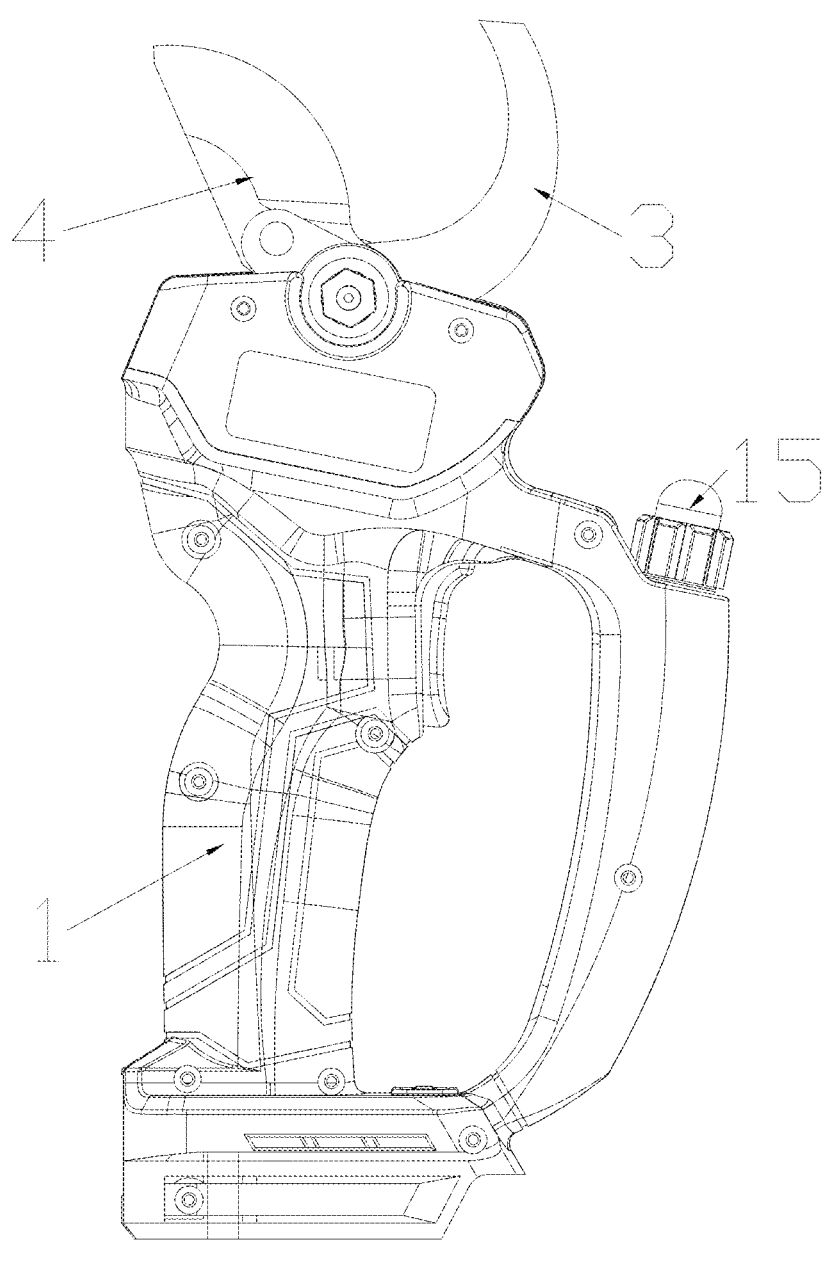
FIG. 1 is a front view of an electric pruning shear according to the present invention.
Figure 2:
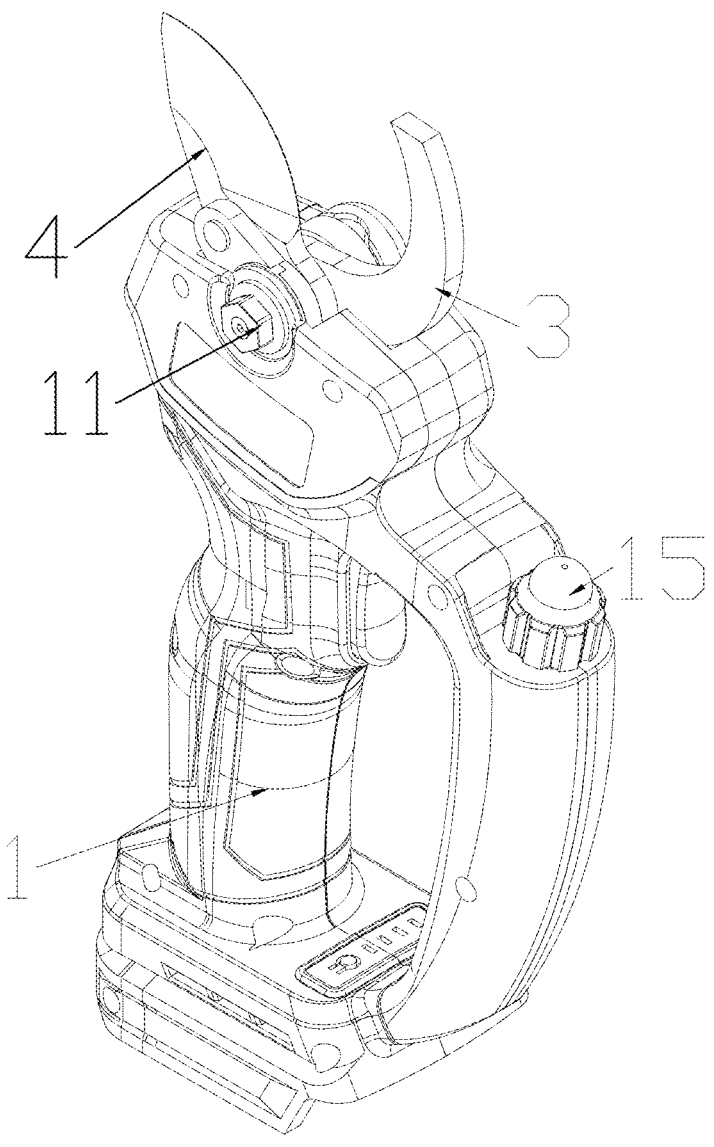
FIG. 2 is a perspective schematic view of the electric pruning shear according to the present invention.
Figure 3:
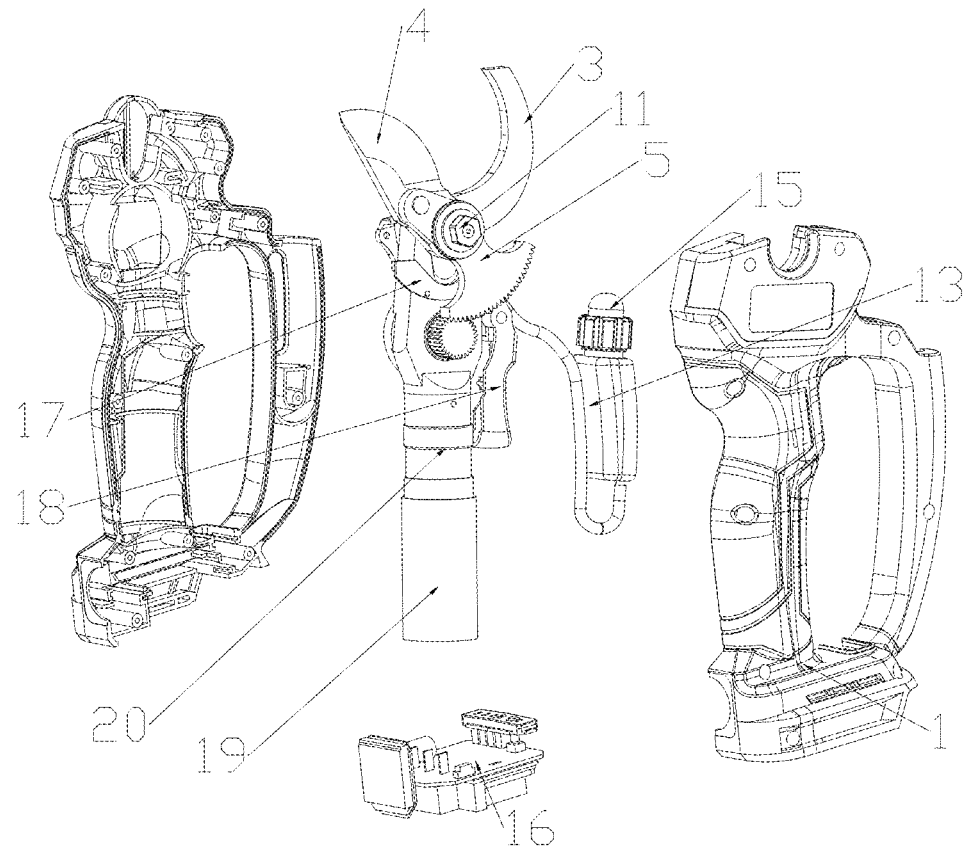
FIG. 3 is an exploded view of the electric pruning shear according to the present invention.
Figure 4:
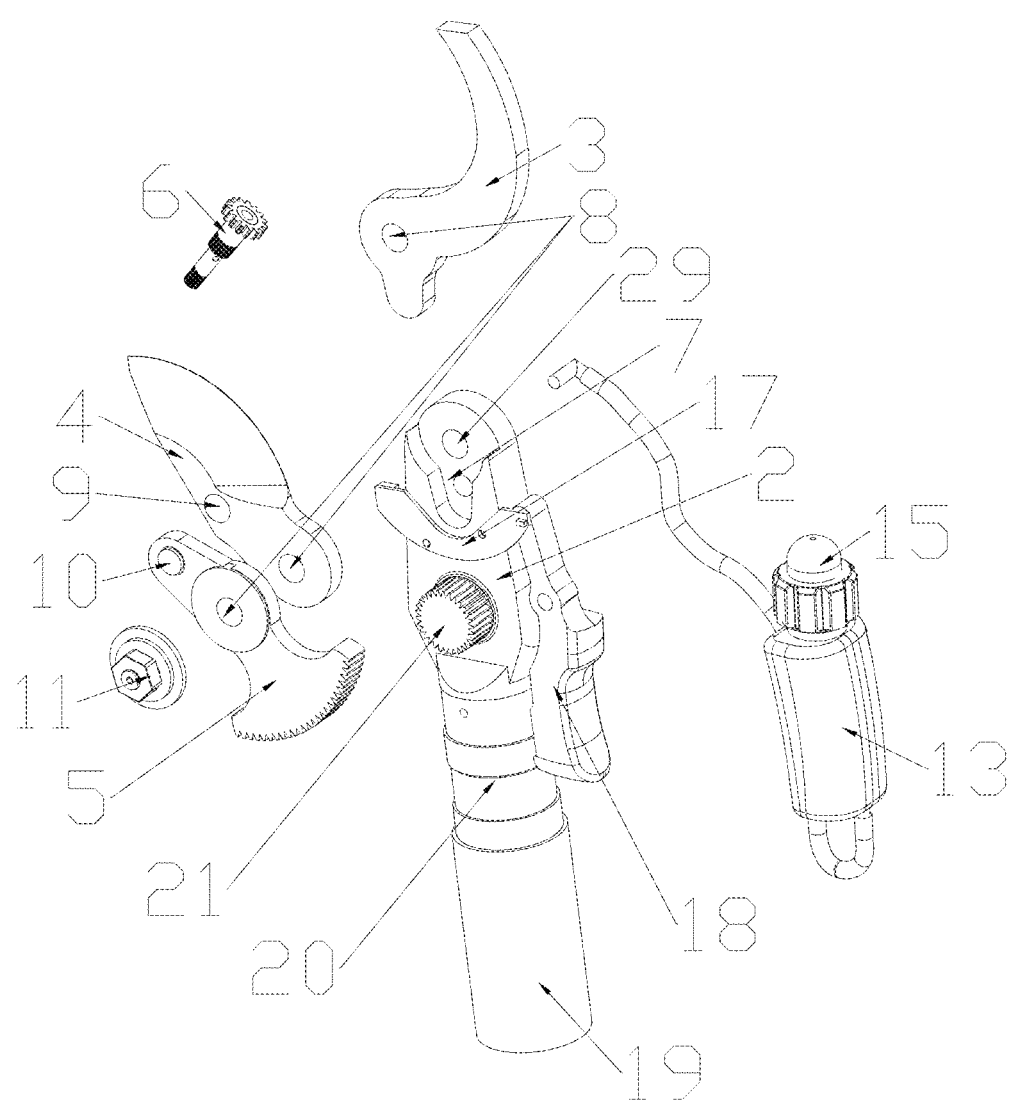
FIG. 4 is an exploded view of the drive assembly and the shearing assembly of the electric pruning shear according to the present invention.
Figure 5:
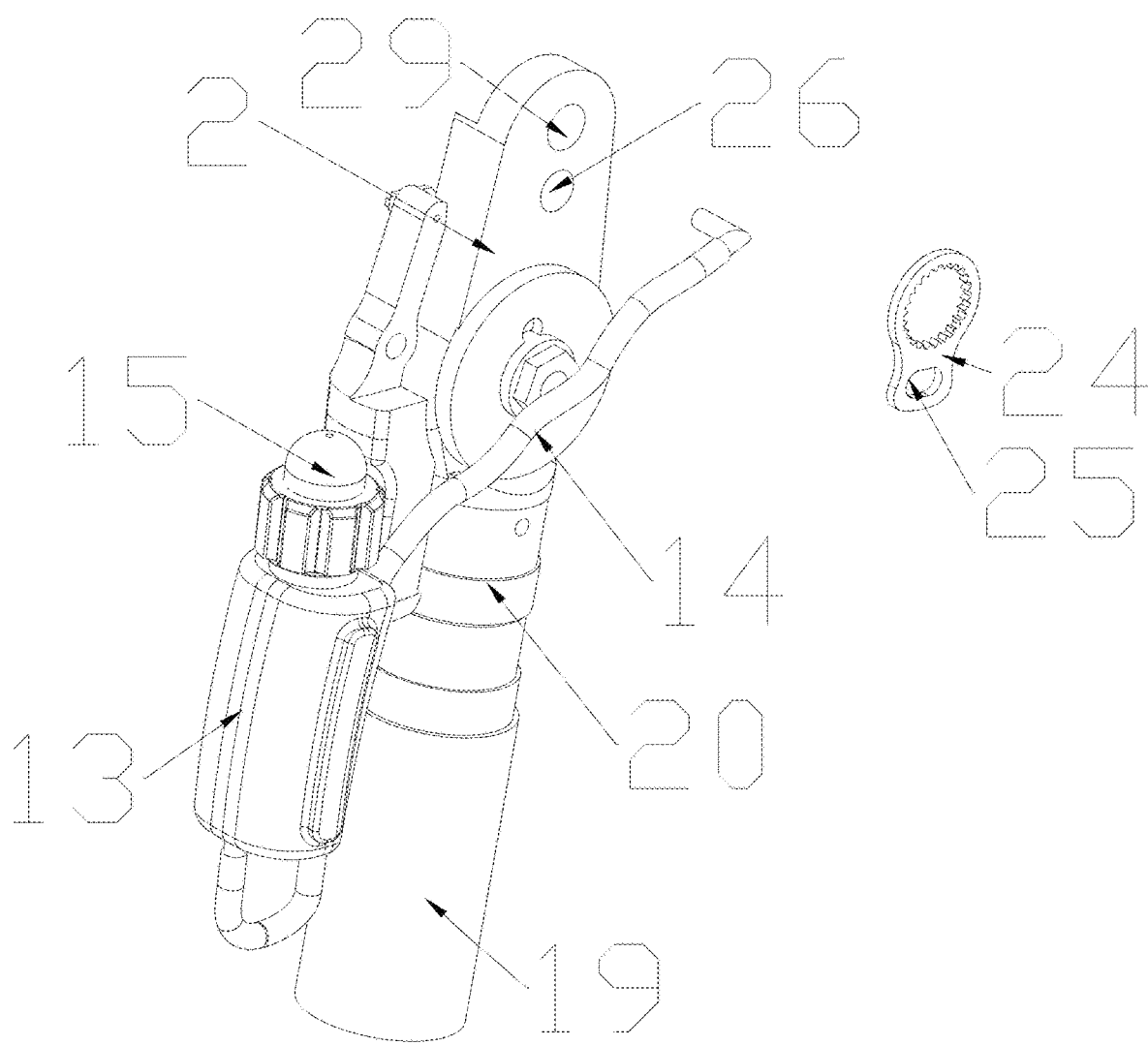
FIG. 5 is a schematic structural view of the drive assembly and the oil reservoir of the electric pruning shear according to the present invention.
Figure 6:
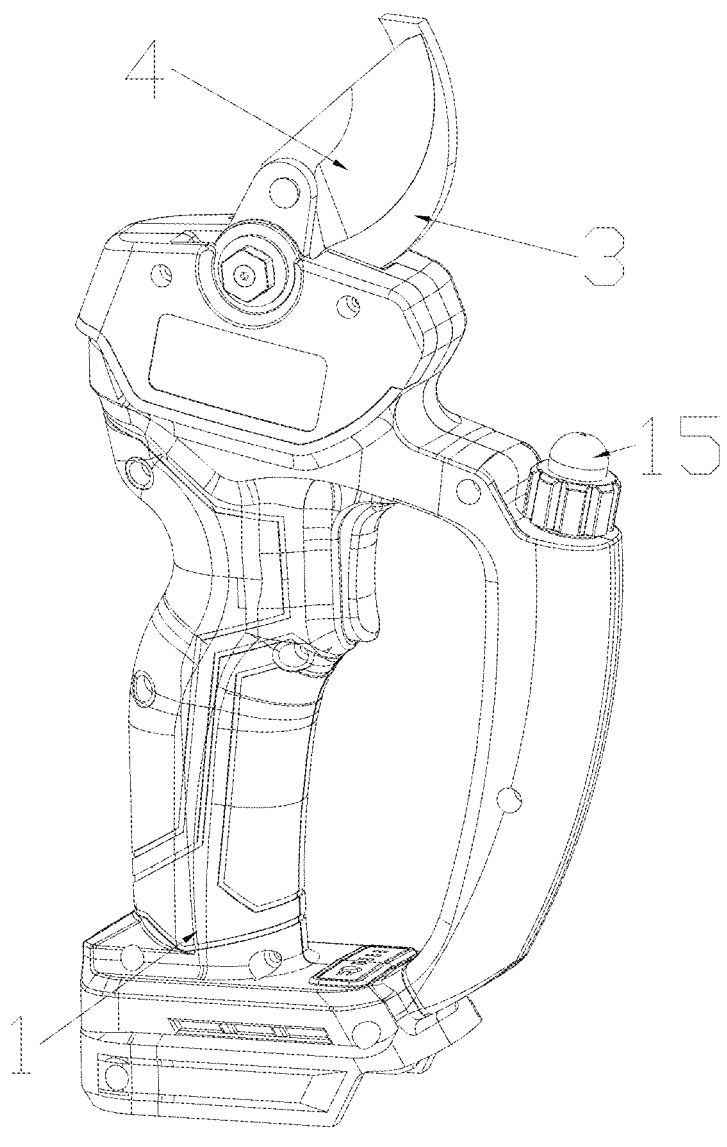
FIG. 6 is a front perspective view of the electric pruning shear with the moving blade in a closed state.
Figure 7:
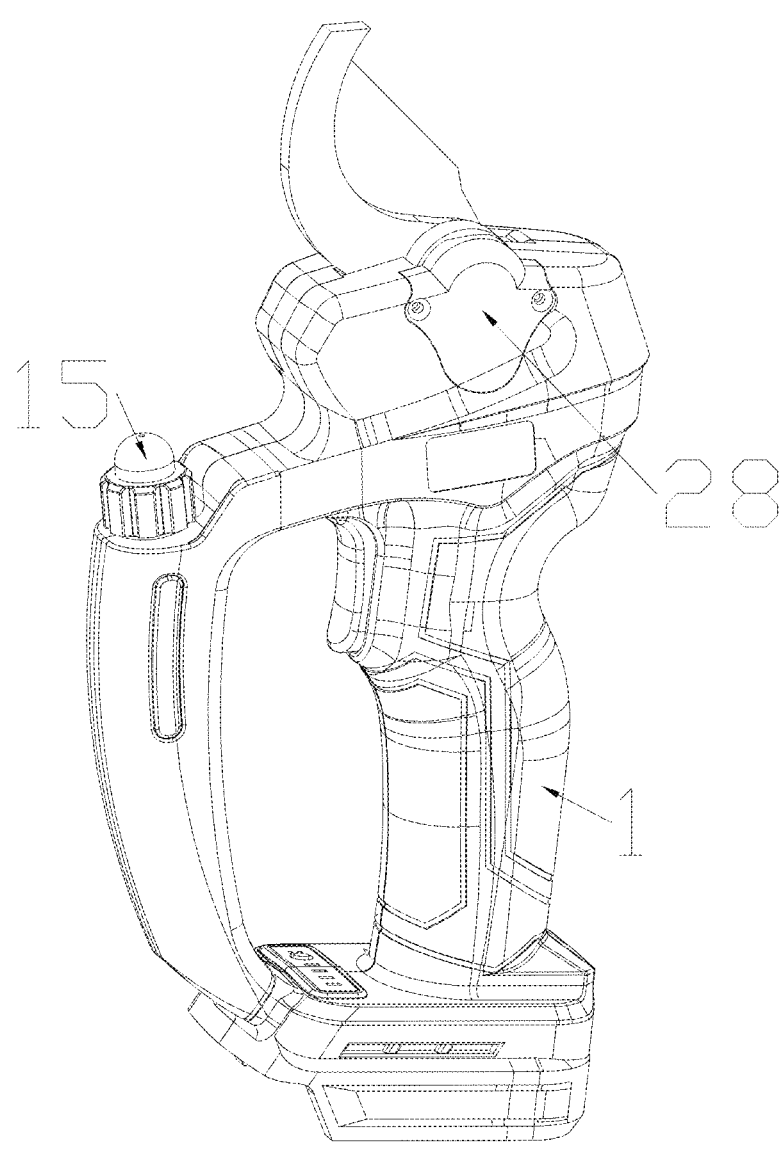
FIG. 7 is a rear perspective view of the electric pruning shear with the moving blade in a closed state.
Figure 8:
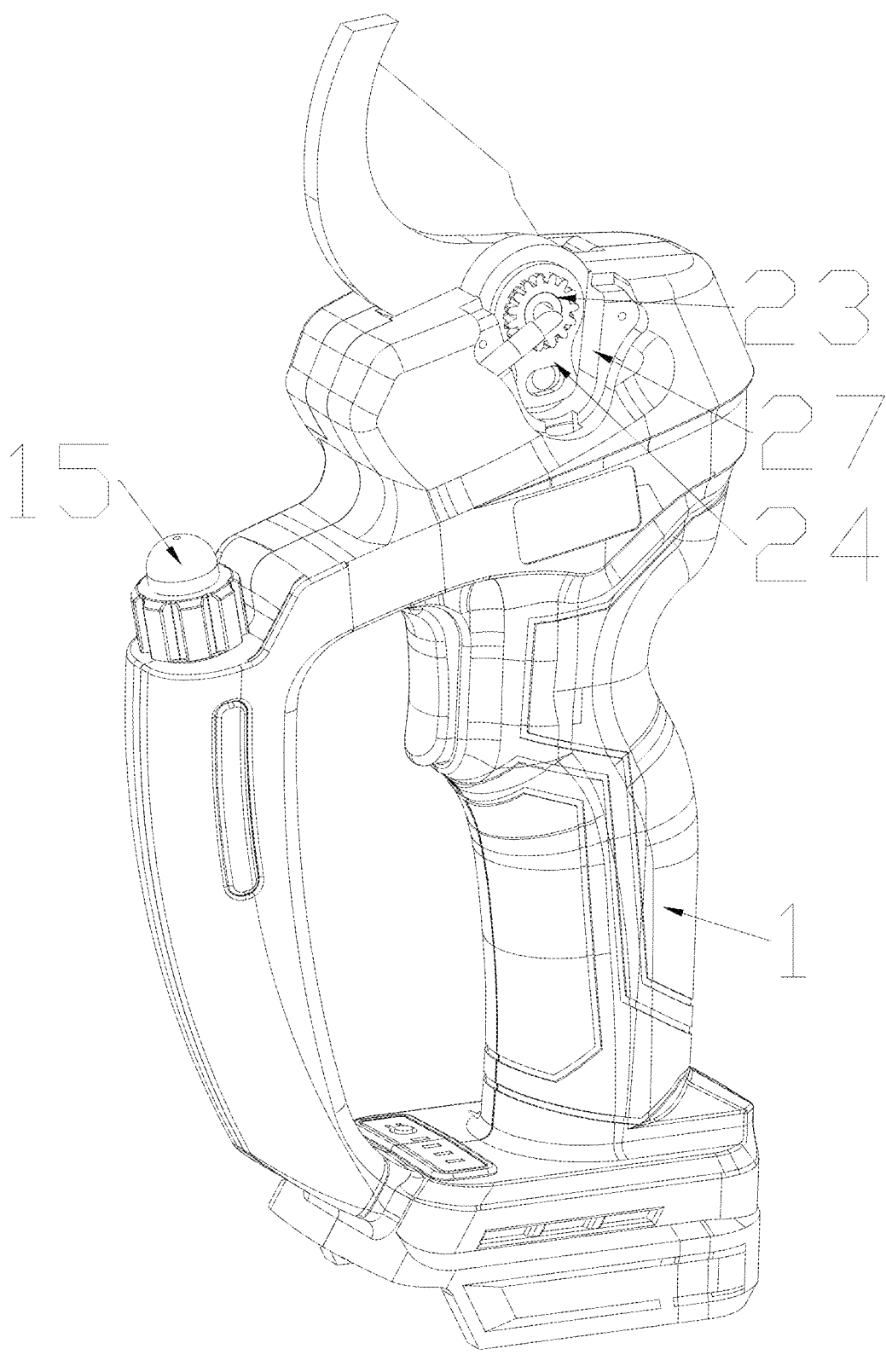
FIG. 8 is an exploded view of the electric pruning shear with the moving blade in a closed state.
Figure 9:
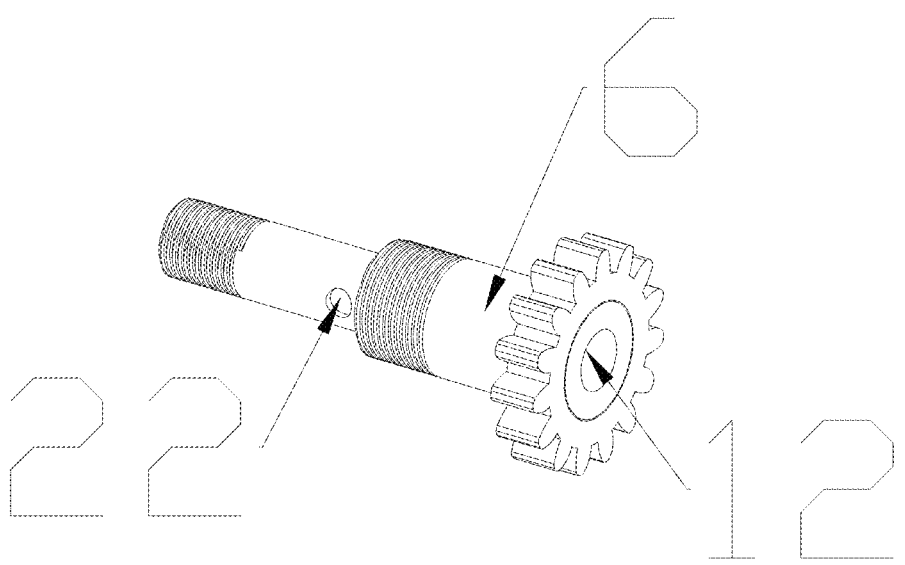
FIG. 9 is a schematic structural view of the spindle of the electric pruning shear according to the present invention.

With reference to FIGS. 1-9, an electric pruning shear comprises a housing 1, a drive assembly mounted inside the housing, a support frame 2, a shearing assembly mounted on the support frame 2, and a control mechanism installed inside the housing 1. The support frame 2 is mounted at an upper end of the drive assembly. The control mechanism is electrically connected to the drive assembly and is configured to control activation and deactivation of the drive assembly.

The shearing assembly comprises a fixed blade 3, a moving blade 4, an oscillating tooth 5, and a spindle 6. One side of the support frame 2 is provided with a fixed blade mounting slot 7. An upper end of the support frame 2 is provided with a shaft hole 29 penetrating through the support frame 2 and the fixed blade mounting slot 7. The spindle 6 is disposed in the shaft hole 29. The fixed blade 3, a lower portion of the moving blade 4, and a middle-upper portion of the oscillating tooth 5 are each provided with a spindle hole 8. The spindle hole 8 of the fixed blade 3 is sleeved on the spindle 6, and the lower portion of the fixed blade 3 is mounted in the fixed blade mounting slot 7. The fixed blade mounting slot 7 limits the fixed blade 3, preventing it from rotating about the spindle 6, thereby keeping it fixed. Similarly, the spindle hole 8 of the oscillating tooth 5 can also preferably be provided with a bearing.

The moving blade 4 is disposed outside the fixed blade 3 and is rotatably connected to the spindle 6 via its spindle hole 8.

In a preferred embodiment of the present solution, the spindle hole 8 of the moving blade 4 is equipped with a bearing. The cooperation between the bearing and the spindle 6 allows for smoother rotation.

The drive assembly comprises a motor 19 and a gearbox 20 connected to the motor 19. A lower end of the support frame 2 is mounted on an upper end of the gearbox 20, and an output shaft of the gearbox 20 extends into the support frame 2. One side of the support frame 2 is provided with a drive gear 21 driven by the output shaft of the gearbox 20. The motor 19 is electrically connected to the control board 16.

The drive assembly drives the shearing assembly via the single drive gear 21. The oscillating tooth 5 is disposed outside the moving blade 4 and is rotatably connected to the spindle 6 via its spindle hole 8. An upper end of the oscillating tooth 5 and a middle-lower portion of the moving blade 4 are each provided with a connection hole 9. A connection shaft 10 passes through these two connection holes 9, pivotally connecting the oscillating tooth 5 and the moving blade 4 together, thereby achieving linkage between the oscillating tooth 5 and the moving blade 4. A lower end of the oscillating tooth 5 meshes with the drive gear 21. The drive assembly drives the oscillating tooth 5 to oscillate, which in turn drives the moving blade 4 to oscillate about the spindle 6, thereby achieving the opening and closing action of the pruning shear. A lock nut 11 is provided on the spindle 6 outside the oscillating tooth 5. Another end of the spindle 6 is provided with an oil inlet hole 12. The spindle 6 is provided with an oil outlet hole 22 communicating with the oil inlet hole 12.

Specifically, when the motor 19 is activated, power is transmitted through the gearbox 20 to the drive gear 21. The rotation of the drive gear 21 causes the oscillating tooth 5 to oscillate about its spindle hole 8. The oscillation of the oscillating tooth 5, in turn, drives the moving blade 4 via the connection shaft 10 to perform a reciprocating oscillation about the spindle 6, thereby achieving the opening and closing cutting action between the moving blade 4 and the fixed blade 3.

The electric pruning shear also includes an oil reservoir 13 installed inside the housing 1, used for storing a certain amount of lubricating oil. A lower end of the oil reservoir 13 is provided with an oil tube 14 communicating with its interior. The other end of the oil tube 14 is connected to the oil inlet hole 12. An upper end of the oil reservoir 13 is provided with a plunger button 15.

When lubrication is required, the user presses the plunger button 15. The lubricating oil inside the oil reservoir 13 is forced under pressure through the oil tube 14 into the oil inlet hole 12 of the spindle 6. The lubricating oil can then permeate through the gaps between the spindle 6 and the mating surfaces of components like bearings and the shaft hole, effectively lubricating the areas where the moving blade 4 and the oscillating tooth 5 rotate about the spindle 6.

A lock nut 11 is also provided on the spindle 6 outside the oscillating tooth 5, used to fix the axial position of the entire shearing assembly on the spindle 6.

The control mechanism is used to control the operation of the entire tool and comprises a control board 16, a Hall effect board 17, and a trigger switch 18. The control board 16 is disposed at the bottom inside the housing 1. The support frame 2 is provided with the Hall effect board 17 below the moving blade 4. The Hall effect board 17 is electrically connected to the control board 16. One side of the support frame 2 inside the housing 1 is rotatably provided with the trigger switch 18 that cooperates with the Hall effect board 17.

Specifically, when the user pulls the trigger switch 18, it triggers the Hall effect board 17 to generate a signal. This signal is transmitted to the control board 16, which then controls the activation and deactivation of the motor 19.

The end of the spindle 6 provided with the oil inlet hole 12 is provided with a locking gear 23 via a key. The locking gear 23 is sleeved with a locking element 24. The locking gear 23 meshes with the inner wall of the locking element 24. A bottom of the locking element 24 is provided with a locking slot 25.

The support frame 2 is provided with a locking screw hole 26 below the shaft hole 29. The locking element 24 is connected by a bolt to the locking screw hole 26, used to fix the locking element 24, thereby locking the spindle 6 and the locking gear 23.

The housing is provided with a slot 27 on the side adjacent to the locking gear 23 for accommodating the locking element 24. The slot 27 is snap-fitted with a protective cover 28.

Specifically, when the tool is not in use, the protective cover 28 can be removed. Then, the end of the oil tube 14 connected to the oil inlet hole 12 is disconnected from the oil inlet hole 12. Subsequently, the locking element 24 is sleeved onto the locking gear 23 and meshes with it. Then, a bolt is passed through the locking slot 25 and screwed into the locking screw hole 26 to fix the locking element 24, thereby locking the spindle 6 and the locking gear 23. This prevents accidental activation of the trigger switch 18 during non-use, causing the electric pruning shear to operate, enhancing safety.

When the electric pruning shear needs to be used, the locking element 24 must be removed to release the lock on the locking gear 23. Then, the oil tube 14 is inserted into the oil inlet hole 12, and the protective cover 28 is put back in place. The electric pruning shear can then be operated via the trigger switch 18.

During specific implementation of the present invention:

In use, the user installs a battery at the bottom of the housing 1, then pulls the trigger switch 18. After the control board 16 receives the signal from the Hall effect board 17, it activates the motor 19. The power from the motor 19 is reduced in speed and increased in torque by the gearbox 20, then transmitted by the drive gear 21 to the oscillating tooth 5. The oscillating tooth 5 oscillates and drives the moving blade 4 to move relative to the fixed blade 3, completing the cutting action.

During prolonged operation or regular maintenance, the user only needs to press the plunger button 15 on the upper end of the oil reservoir 13 to deliver lubricating oil to the moving pairs at the spindle 6, achieving convenient and timely lubrication, significantly reducing maintenance difficulty and component wear.

In the description of the embodiments of the present invention, it should be noted that if terms such as "center", "upper", "lower", "left", "right", "vertical", "horizontal", "inner", "outer", etc., are used to indicate orientations or positional relationships, these are based on the orientations or positional relationships shown in the accompanying drawings, or the conventional orientations or positional relationships in which the product of the invention is typically used. These terms are used only to facilitate the description of the present invention and to simplify the description, and do not indicate or imply that the referred device or element must have a specific orientation or be constructed and operated in a specific orientation. Therefore, they should not be construed as limiting the present invention. Furthermore, terms such as "first", "second", "third", etc., are used only for descriptive distinction and should not be understood as indicating or implying relative importance.

Moreover, if terms such as "horizontal", "vertical", "suspended", etc., are used, they do not require that the components be absolutely horizontal or suspended but may be slightly inclined. For example, "horizontal" merely means that its direction is more horizontal compared to "vertical", and does not mean that the structure must be completely horizontal; it may be slightly inclined.

In the description of the embodiments of the present invention, "a plurality of" means at least two.

In the description of the embodiments of the present invention, it should also be noted that, unless otherwise explicitly specified and defined, terms such as "set", "install", "connect", and "link" should be understood in a broad sense. For example, they may refer to a fixed connection, a detachable connection, or an integral connection; a mechanical connection or an electrical connection; a direct connection or an indirect connection through an intermediate medium; or an internal connection between two elements. Those of ordinary skill in the art can understand the specific meanings of the above terms in the present invention based on the specific context.

The present invention and its embodiments have been described above. This description is not limiting, and the illustrations in the accompanying drawings show only one of the embodiments of the present invention. The actual structure is not limited to this. In summary, if those of ordinary skill in the art are inspired by the present invention and, without departing from the creative purpose of the invention, design similar structural methods and embodiments without creative effort, these should all fall within the protection scope of the present invention.

The invention claimed is:

1. An electric pruning shear, comprising a housing, a drive assembly mounted inside the housing, a support frame, a shearing assembly mounted on the support frame, and a control mechanism installed inside the housing, wherein the support frame is mounted at an upper end of the drive assembly, the control mechanism is electrically connected to the drive assembly, and is used to control activation and deactivation of the drive assembly;

the shearing assembly comprises a fixed blade, a moving blade, an oscillating tooth, and a spindle, wherein one side of the support frame is provided with a fixed blade mounting slot, an upper end of the support frame is provided with a shaft hole penetrating through the support frame and the blade mounting slot, the spindle is disposed in the shaft hole, the fixed blade, a lower portion of the moving blade, and a middle-upper portion of the oscillating tooth are each provided with a spindle hole, the spindle hole of the fixed blade is sleeved on the spindle, and the lower portion of the fixed blade is mounted in the fixed blade mounting slot, the fixed blade mounting slot limits the fixed blade so that the fixed blade is fixed and cannot rotate, the moving blade is disposed outside the fixed blade and is rotatably connected to the spindle via the spindle hole, the oscillating tooth is disposed outside the moving blade and is rotatably connected to the spindle via the spindle hole, an upper end of the oscillating tooth and a middle-lower portion of the moving blade are each provided with a connection hole, the connection hole is rotatably provided with a connection shaft connecting the oscillating tooth and the moving blade, thereby achieving linkage between the oscillating tooth and the moving blade, a lower end of the oscillating tooth meshes with the drive assembly, the drive assembly drives the oscillating tooth to oscillate, thereby driving the moving blade to oscillate about the spindle to achieve opening and closing of the pruning shear, an outer side of the oscillating tooth on the spindle is provided with a lock nut, one end of the spindle is provided with an oil inlet hole, and the spindle is provided with an oil outlet hole communicating with the oil inlet hole;

it further comprises an oil reservoir installed inside the housing, a lower end of the oil reservoir is provided with an oil tube communicating with the interior of the oil reservoir, another end of the oil tube is communicated with the oil inlet hole, and an upper end of the oil reservoir is provided with a plunger button.

2. The electric pruning shear of claim 1, wherein the control mechanism comprises a control board, a Hall effect board, and a trigger switch, the control board is disposed at a bottom inside the housing, the support frame is provided with the Hall effect board below the moving blade, the Hall effect board is electrically connected to the control board, and one side of the support frame inside the housing is rotatably provided with the trigger switch cooperating with the Hall effect board.

3. The electric pruning shear of claim 2, wherein the drive assembly comprises a motor and a gearbox connected to the motor, a lower end of the support frame is mounted on an upper end of the gearbox, and an output shaft of the gearbox extends into the support frame, one side of the support frame is provided with a drive gear driven by the output shaft of the gearbox, the oscillating tooth meshes with the drive gear, and the motor is electrically connected to the control board.

4. The electric pruning shear of claim 1, wherein the spindle holes of the moving blade and the oscillating tooth are each provided with a bearing, and the moving blade and the oscillating tooth are each rotatably connected to the spindle via the bearing.

5. The electric pruning shear of claim 1, wherein one end of the spindle provided with the oil inlet hole is provided with a locking gear via a key, the locking gear is sleeved with a locking element, the locking gear meshes with an inner wall of the locking element, and a bottom of the locking element is provided with a locking slot;

the support frame is provided with a locking screw hole below the shaft hole, the locking element is connected by a bolt to the locking screw hole, and is used to fix the locking element, thereby locking the spindle and the locking gear;

one side of the housing adjacent to the locking gear is provided with a slot for accommodating the locking element, and the slot is snap-fitted with a protective cover.

* * * * *